US010148573B2

(12) United States Patent
Zhang et al.

(10) Patent No.: US 10,148,573 B2
(45) Date of Patent: Dec. 4, 2018

(54) PACKET PROCESSING METHOD, NODE, AND SYSTEM

(71) Applicant: Huawei Technologies Co., Ltd., Shenzhen (CN)

(72) Inventors: Lin Zhang, Shenzhen (CN); Dayu Sun, Shenzhen (CN); Shujian Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 80 days.

(21) Appl. No.: 15/191,234

(22) Filed: Jun. 23, 2016

(65) Prior Publication Data

US 2016/0308770 A1    Oct. 20, 2016

Related U.S. Application Data

(63) Continuation of application No. PCT/CN2014/086194, filed on Sep. 10, 2014.

(30) Foreign Application Priority Data

Dec. 24, 2013  (CN) .......................... 2013 1 0722660

(51) Int. Cl.
*G01R 31/08* (2006.01)
*H04L 12/801* (2013.01)
(Continued)

(52) U.S. Cl.
CPC .............. *H04L 47/12* (2013.01); *H04L 12/10* (2013.01); *H04L 41/5054* (2013.01);
(Continued)

(58) Field of Classification Search
CPC ...................................................... H04L 47/12
See application file for complete search history.

(56) References Cited

U.S. PATENT DOCUMENTS 6,850,482 B1    2/2005  Ashdown et al.
6,856,991 B1 *  2/2005  Srivastava ........ H04L 29/12066
(Continued)

FOREIGN PATENT DOCUMENTS

CN        1906902 A      1/2007
CN      102647347 A      8/2012
(Continued)

OTHER PUBLICATIONS

Machine Translation and Abstract of Chinese Publication No. CN102647347, dated Aug. 22, 2012, 7 pages.
(Continued)

*Primary Examiner* — Gerald A Smarth
(74) *Attorney, Agent, or Firm* — Conley Rose, P.C.

(57) ABSTRACT

A packet processing method, node, and system. An ingress delivery node receives a notification message that is returned by an egress delivery node after the egress delivery node receives a first packet, where the notification message includes modification information carried in the first packet, modifies, according to the modification information, a subsequently received second packet that belongs to a same service flow as the first packet, and sends the modified second packet to the egress delivery node. After modifying the subsequently received second packet that belongs to the same service flow as the first packet, the ingress delivery node directly sends the subsequently received second packet to the egress delivery node such that the second packet does not need to be processed by a service chain between the ingress delivery node and the egress delivery node.

20 Claims, 10 Drawing Sheets

(51) Int. Cl.
| | |
|---|---|
| *H04L 12/10* | (2006.01) |
| *H04L 12/741* | (2013.01) |
| *H04L 12/24* | (2006.01) |
| *H04L 12/26* | (2006.01) |
| *H04L 12/725* | (2013.01) |
| *H04L 12/721* | (2013.01) |
| *H04L 12/717* | (2013.01) |
| *H04L 12/851* | (2013.01) |

(52) U.S. Cl.
CPC .......... *H04L 43/028* (2013.01); *H04L 45/306* (2013.01); *H04L 45/38* (2013.01); *H04L 45/42* (2013.01); *H04L 45/745* (2013.01); *H04L 47/10* (2013.01); *H04L 47/2441* (2013.01); *H04L 41/0893* (2013.01)

(56) References Cited

U.S. PATENT DOCUMENTS

| | | | |
|---|---|---|---|
| 9,219,684 B2* | 12/2015 | Dzekon | H04L 45/72 |
| 2004/0213272 A1 | 10/2004 | Nishi et al. | |
| 2006/0092921 A1 | 5/2006 | Narayanan et al. | |
| 2008/0049752 A1* | 2/2008 | Grant | H04L 12/4641 370/392 |
| 2008/0137653 A1 | 6/2008 | Jonsson | |
| 2009/0141730 A1* | 6/2009 | Long | H04L 12/4604 370/411 |
| 2010/0103837 A1* | 4/2010 | Jungck | H04L 29/12066 370/252 |
| 2011/0317701 A1 | 12/2011 | Yamato et al. | |
| 2012/0093158 A1 | 4/2012 | Chiba | |
| 2012/0182990 A1 | 7/2012 | Cao | |
| 2013/0094509 A1 | 4/2013 | Chen et al. | |
| 2013/0163606 A1 | 6/2013 | Bagepalli et al. | |

FOREIGN PATENT DOCUMENTS

| | | |
|---|---|---|
| CN | 102739524 A | 10/2012 |
| CN | 102917443 A | 2/2013 |
| CN | 103108331 A | 5/2013 |
| EP | 1164754 A1 | 12/2001 |
| JP | H11215134 A | 8/1999 |
| JP | H11239153 A | 8/1999 |
| JP | 2004165970 A | 6/2004 |
| JP | 2004304371 A | 10/2004 |
| WO | 2012144194 A1 | 10/2012 |

OTHER PUBLICATIONS

Machine Translation and Abstract of Chinese Publication No. CN102739524, dated Oct. 17, 2012, 12 pages.
Machine Translation and Abstract of Japanese Publication No. JP2004165970, dated Jun. 10, 2004, 17 pages.
Machine Translation and Abstract of Japanese Publication No. JPH11215134, dated Aug. 6, 1999, 22 pages.
Machine Translation and Abstract of Japanese Publication No. JPH11239153, dated Aug. 31, 1999, 15 pages.
Foreign Communication From a Counterpart Application, Chinese Application No. 201310722660.6, Chinese Office Action dated Jul. 19, 2017, 8 pages.
Foreign Communication From a Counterpart Application, Japanese Application No. 2016-542722, Japanese Office Action dated Jul. 18, 2017, 2 pages.
Foreign Communication From a Counterpart Application, Japanese Application No. 2016-542722, English Translation of Japanese Office Action dated Jul. 18, 2017, 3 pages.
Foreign Communication From a Counterpart Application, European Application No. 14874011.1, Extended European Search Report dated Nov. 14, 2016, 7 pages.
Foreign Communication From a Counterpart Application, PCT Application No. PCT/CN2014/086194, English Translation of International Search Report dated Dec. 10, 2014, 2 pages.
Foreign Communication From a Counterpart Application, PCT Application No. PCT/CN2014/086194, English Translation of Written Opinion dated Dec. 10, 2014, 5 pages.
Machine Translation and Abstract of Chinese Publication No. CN102917443, dated Feb. 6, 2013, 15 pages.
Machine Translation and Abstract of Chinese Publication No. CN103108331, dated May 15, 2013, 19 pages.

\* cited by examiner

PACKET PROCESSING METHOD, NODE, AND SYSTEM

CROSS-REFERENCE TO RELATED APPLICATIONS

This application is a continuation of International Application No. PCT/CN2014/086194, filed on Sep. 10, 2014, which claims priority to Chinese Patent Application No. 201310722660.6, filed on Dec. 24, 2013, both of which are hereby incorporated by reference in their entireties.

TECHNICAL FIELD

The present disclosure relates to the communications field, and in particular, to a packet processing method, node, and system.

BACKGROUND

A data center is a center for data computing, network transmission, and storage. With development of a CLOUD COMPUTING technology, a scale of a data center is continuously increasing.

In a data center network, a process in which a service node processes a packet that is from a client to a server is as follows: the client sends the packet to a delivery node, and the delivery node sends the packet to the service node to perform processing, and after completing the processing, the service node sends the packet to the delivery node. If there are multiple service nodes, the delivery node continues to send the packet to a next service node to perform processing.

In this packet processing method, service nodes process a packet in order, which increases load of the service nodes, and affects packet processing efficiency.

SUMMARY

The present disclosure provides a packet processing method, node, and system, which can reduce load of a service node, thereby increasing packet processing efficiency.

According to a first aspect, the present disclosure provides a packet processing method which is performed by an ingress delivery node of a service chain, including receiving a notification message that is returned by an egress delivery node of the service chain after the egress delivery node receives a first packet, where the notification message includes modification information carried in the first packet, modifying, according to the modification information, a subsequently received second packet that belongs to a same service flow as the first packet, and sending the modified second packet to the egress delivery node.

According to a second aspect, a packet processing method is provided, where the method is performed by an egress delivery node of a service chain, and the method includes receiving a first packet from a service node on the service chain, where the first packet carries modification information and an offloading option, sending a notification message to an ingress delivery node of the service chain according to the offloading option, where the notification message includes the modification information carried in the first packet such that the ingress delivery node modifies, according to the modification information, a second packet that belongs to a same service flow as the first packet, and receiving the modified second packet sent by the ingress delivery node.

According to a third aspect, a packet processing node is provided, where the packet processing node is an ingress delivery node of a service chain, and the packet processing node includes a receiving unit configured to receive a notification message that is returned by an egress delivery node of the service chain after the egress delivery node receives a first packet, where the notification message includes modification information carried in the first packet, a modification unit configured to modify, according to the modification information, a subsequently received second packet that belongs to a same service flow as the first packet, and a sending unit configured to send the modified second packet to the egress delivery node.

According to a fourth aspect, a packet processing node is provided, where the packet processing node is an egress delivery node of a service chain, and the packet processing node includes a receiving unit configured to receive a first packet from a service node on the service chain, where the first packet carries modification information and an offloading option, and a sending unit configured to return a notification message to an ingress delivery node of the service chain according to the offloading option, where the notification message includes the modification information carried in the first packet such that the ingress delivery node modifies, according to the modification information, a second packet that belongs to a same service flow as the first packet, where the receiving unit is further configured to receive the modified second packet sent by the ingress delivery node.

Based on the foregoing solutions, according to the packet processing method, node, and system in the embodiments of the present disclosure, modification information that is returned by an egress delivery node after the egress delivery node receives a first packet and that is carried in the first packet is received, a subsequently received second packet that belongs to a same service flow as the first packet is modified according to the modification information, and the modified second packet is sent to the egress delivery node. In this way, after modifying the subsequently received second packet that belongs to the same service flow as the first packet, an ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
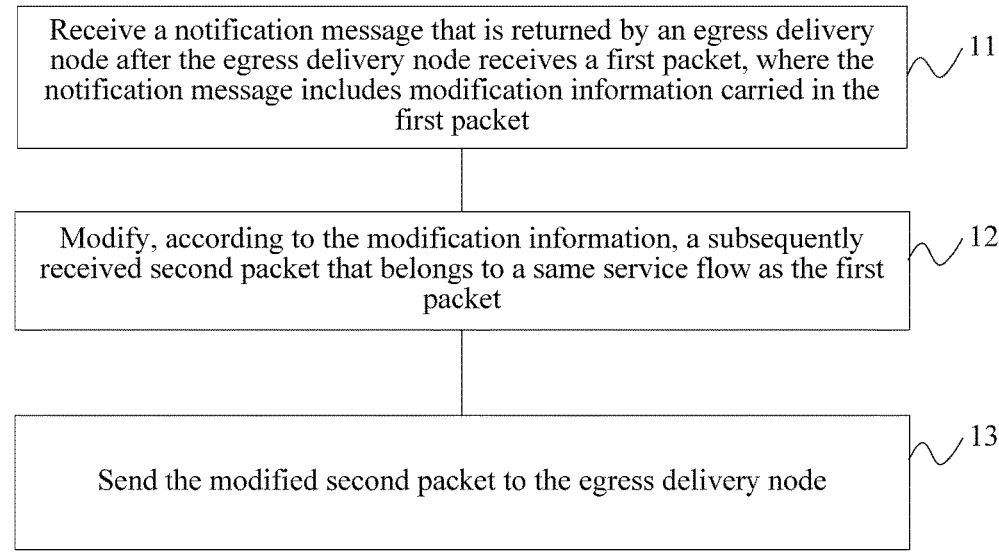
FIG. 1 is a flowchart of a packet processing method according to an embodiment of the present disclosure.

FIG. 1 is a flowchart of a packet processing method according to an embodiment of the present disclosure. For ease of description, descriptions are provided using an example in which the method is executed by an ingress delivery node. However, this embodiment of the present disclosure is not limited thereto. As shown in FIG. 1, the method includes the following steps.

Step 11: Receive a notification message that is returned by an egress delivery node after the egress delivery node receives a first packet, where the notification message includes modification information carried in the first packet.

Step 12: Modify, according to the modification information, a subsequently received second packet that belongs to a same service flow as the first packet.

Step 13: Send the modified second packet to the egress delivery node.

According to the method in this embodiment of the present disclosure, modification information that is returned by an egress delivery node after the egress delivery node receives a first packet and that is carried in the first packet is received, a subsequently received second packet that belongs to a same service flow as the first packet is modified according to the modification information, and the modified second packet is sent to the egress delivery node. In this way, after modifying the subsequently received second packet that belongs to the same service flow as the first packet, an ingress delivery node directly sends the subsequently received second packet to the egress delivery node such that the second packet does not need to be processed by a service chain between the ingress delivery node and the egress delivery node, thereby implementing packet offloading on a service node, which can reduce load of the service node, and increase packet processing efficiency.

The first packet is a packet on which traffic offloading can be performed. In this embodiment of the present disclosure, it may be determined, according to a type of service processing that needs to be performed on a service flow, whether a packet in the service flow is a packet that can be offloaded. For example, a packet on which only transport-layer processing is performed is a packet that can be offloaded, such as a packet of a packet filtering service or a packet of a network address translation (NAT) service, a packet on which application-layer processing may be performed is a packet that cannot be offloaded, such as a packet of an antivirus processing (AV) service or a packet of an intrusion prevention system (IPS) service. Because the first packet needs to be processed by a service chain, the first packet is not offloaded. That the first packet is a packet on which traffic offloading can be performed actually refers to that, the first packet is a packet in a service flow on which traffic offloading can be performed, and a subsequent packet in the service flow can be offloaded.

In this embodiment of the present disclosure, optionally, before step 11 of receiving a notification message that is returned by an egress delivery node after the egress delivery node receives a first packet, the method further includes receiving the first packet, where the first packet includes quintuple information, adding an offloading option to the first packet, where the offloading option includes information about an ingress delivery node, and a flow entry identifier, and sending, to a service node on a service chain, the first packet to which the offloading option has been added.

On the service chain, at least one service node is configured to process the first packet.

Accordingly, the service node on the service chain modifies the quintuple information, to obtain the modification information in step 11.

In another embodiment of the present disclosure, optionally, the ingress delivery node receives a third packet, generates a flow entry for a service flow to which the third packet belongs, allocates a flow entry identifier to the flow entry, adds an offloading option including information about the ingress delivery node, and the flow entry identifier to the third packet, sends the third packet to which the offloading option has been added, sets a corresponding timer for the flow entry, and sets a preset time. After sending the third packet, if the ingress delivery node does not receive a second notification message that includes modification information carried in the third packet, and the preset time does not expire, after receiving a subsequent packet in a service flow to which the third packet belongs, the ingress delivery node may forward the subsequent packet to a service node on a service chain according to the flow entry identifier. If the second notification message that includes the modification information carried in the third packet is not received within the preset time, that is, the second notification message is not received after the timer times out, it may be determined that the third packet is discarded, and the ingress delivery node directly discards a subsequently received fourth packet that belongs to a same service flow as the third packet. The preset time may be set in advance, or may be changed according to different scenarios.

In this way, when sending the third packet to the service node on the service chain, if the modification information returned by the egress delivery node is not received within the preset time, the ingress delivery node discards the fourth packet that belongs to the same service flow as the third packet, implementing packet offloading, thereby reducing load of the service node on the service chain.

In this embodiment of the present disclosure, the first packet, the second packet, the third packet, and the fourth packet are designated for ease of description, and do not constitute a limit on this embodiment of the present disclosure.

In this embodiment of the present disclosure, optionally, the ingress delivery node may determine, according to quintuple information of the first packet, the second packet that belongs to the same service flow as the first packet. For example, if the quintuple information of the first packet is the same as quintuple information of the second packet, the first packet and the second packet are packets that belong to the same service flow. In specific implementation, the ingress delivery node adds, to a local flow table, a flow entry used to store the quintuple information of the first packet, that is, generates a flow entry for the service flow to which the first packet belongs, and when receiving the second packet, the ingress delivery node searches the flow table to obtain the flow entry, and then performs corresponding processing on the second packet according to the flow entry.

In this embodiment of the present disclosure, optionally, after receiving the first packet, and before the sending, to a service node on a service chain, the first packet, the method further includes storing the quintuple information into a flow entry of a local flow table, and allocating the flow entry identifier to the flow entry, where accordingly, before the first packet is sent using the service chain, an offloading option further needs to be added to the first packet, where the offloading option includes at least information about the ingress delivery node, and the flow entry identifier. The information about the ingress delivery node may be an Internet Protocol (IP) address of the ingress delivery node.

In this embodiment of the present disclosure, optionally, the ingress delivery node may further determine, according to flow identifiers carried in packets, the second packet that belongs to the same service flow as the first packet. For example, if a flow identifier of the first packet is the same as a flow identifier of the second packet, the first packet and the second packet are packets that belong to the same service flow.

In this embodiment of the present disclosure, optionally, the ingress delivery node may store the modification information and the quintuple information of the first packet in a corresponding manner.

Further, the ingress delivery node stores the quintuple information of the first packet into a flow entry of a local flow table, and allocates a flow entry identifier to the flow entry. Accordingly, the first packet sent by the ingress delivery node further carries an offloading option, where the offloading option includes at least information about the ingress delivery node, and the flow entry identifier. The egress delivery node adds the flow entry identifier and the modification information to the notification message and returns the notification message to the ingress delivery node. The ingress delivery node updates the flow entry according to the flow entry identifier and the modification information, and stores the modification information into a flow entry corresponding to the flow entry identifier (that is, the flow entry that stores the quintuple information of the first packet).

In this way, the ingress delivery node stores the quintuple information and the modification information of the first packet in a corresponding manner, and the ingress delivery node may modify, according to the modification information in the updated flow entry, the subsequently received second packet that belongs to the same service flow as the first packet, where the quintuple information of the second packet is directly modified by the ingress delivery node without being processed by a service chain, thereby implementing packet offloading on a service node, which can reduce load of the service node, and increase packet processing efficiency.

In this embodiment of the present disclosure, optionally, the notification message further includes the flow entry identifier. The method further includes updating the flow entry according to the flow entry identifier and the modification information, where the updated flow entry includes the quintuple information and the modification information, and accordingly, during modifying, according to the modification information, a subsequently received second packet that belongs to a same service flow as the first packet, receiving the second packet, acquiring quintuple information of the second packet, finding the updated flow entry according to the quintuple information, and modifying the second packet according to the modification information.

In an embodiment of the present disclosure, optionally, the offloading option further includes a service type identifier, and the notification message further includes the flow entry identifier and a modified service type identifier that is obtained by updating the service type identifier by a service node on the service chain. The ingress delivery node determines, according to the modified service type identifier, that the service flow to which the first packet belongs is a service flow that can be offloaded or the service flow to which the first packet belongs is a service flow that that cannot be offloaded.

In another embodiment of the present disclosure, the ingress delivery node may further determine, before sending the first packet to the service node on the service chain, whether the first packet belongs to a service flow that can be offloaded or belongs to a service flow that cannot be offloaded.

If the first packet belongs to a service flow that can be offloaded, step 11, step 12, and step 13 are performed, or if the first packet belongs to a service flow that cannot be offloaded, the subsequently received second packet that belongs to the same service flow as the first packet is not modified, and the second packet is sent to the service chain to be processed.

According to the method in this embodiment of the present disclosure, modification information that is returned by an egress delivery node after the egress delivery node receives a first packet and that is carried in the first packet is received, a subsequently received second packet that belongs to a same service flow as the first packet is modified according to the modification information, and the modified second packet is sent to the egress delivery node. In this way, after modifying the subsequently received second packet that belongs to the same service flow as the first packet, an ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

Figure 2:
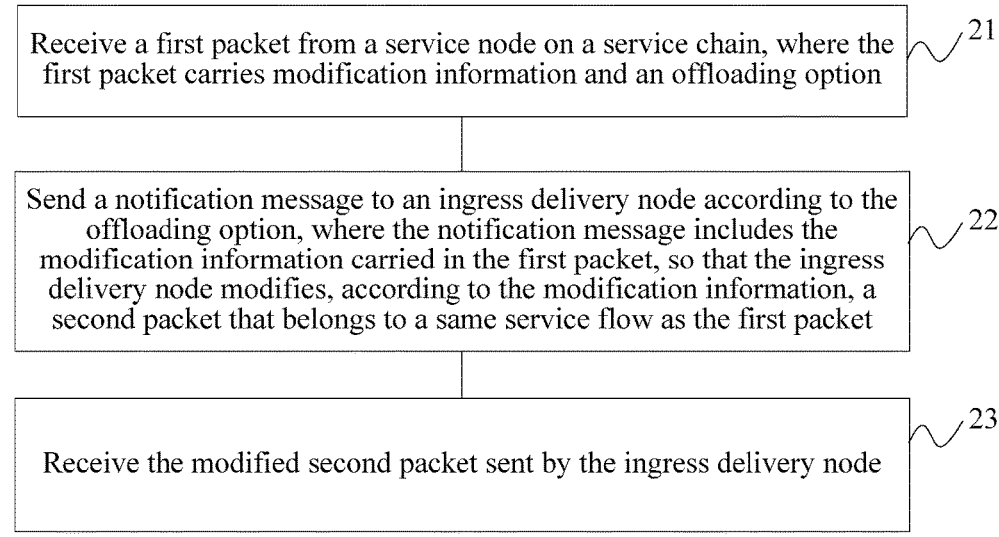
FIG. 2 is a flowchart of another packet processing method according to an embodiment of the present disclosure.

FIG. 2 is a flowchart of another packet processing method according to an embodiment of the present disclosure. For ease of description, descriptions are provided using an example in which the method is executed by an egress delivery node. However, this embodiment of the present disclosure is not limited thereto. As shown in FIG. 2, the method includes the following steps.

Step 21: Receive a first packet from a service node on a service chain, where the first packet carries modification information and an offloading option.

Step 22: Send a notification message to an ingress delivery node according to the offloading option, where the notification message includes the modification information carried in the first packet, so that the ingress delivery node modifies, according to the modification information, a second packet that belongs to a same service flow as the first packet.

Step 23: Receive the modified second packet sent by the ingress delivery node.

In this embodiment of the present disclosure, optionally, the first packet includes quintuple information, and the modification information is modified quintuple information of the first packet, and the quintuple information of the first packet is modified by the service node on the service chain.

In this embodiment of the present disclosure, optionally, the offloading option includes information about the ingress delivery node, and a flow entry identifier, and accordingly, step 22 of sending a notification message to an ingress delivery node according to the offloading option includes acquiring the information about the ingress delivery node, and the flow entry identifier that are in the offloading option, and sending the notification message to the ingress delivery node according to the information about the ingress delivery node, where the notification message further includes the flow entry identifier.

In this embodiment of the present disclosure, optionally, the offloading option further includes a modified service type identifier, where the modified service type identifier is obtained by updating, by the service node on the service chain, a service type identifier sent by the ingress delivery node, and accordingly, step 22 of sending a notification message to an ingress delivery node according to the offloading option includes acquiring the information about the ingress delivery node, the flow entry identifier, and the modified service type identifier that are in the offloading option, and sending the notification message to the ingress delivery node according to the information about the ingress delivery node, where the notification message includes the flow entry identifier and the modified service type identifier.

According to the method in this embodiment of the present disclosure, after a first packet is received, modification information carried in the first packet is returned to an ingress delivery node such that the ingress delivery node modifies, according to the modification information, a second packet that belongs to a same service flow as the first packet, and the modified second packet sent by the ingress delivery node is received. In this way, after modifying the subsequently received second packet that belongs to the same service flow as the first packet, the ingress delivery node directly sends the subsequently received second packet to the egress delivery node such that the second packet does not need to be processed by a service chain between the ingress delivery node and the egress delivery node, thereby reducing load of a service node, and increasing packet processing efficiency.

Figure 3:
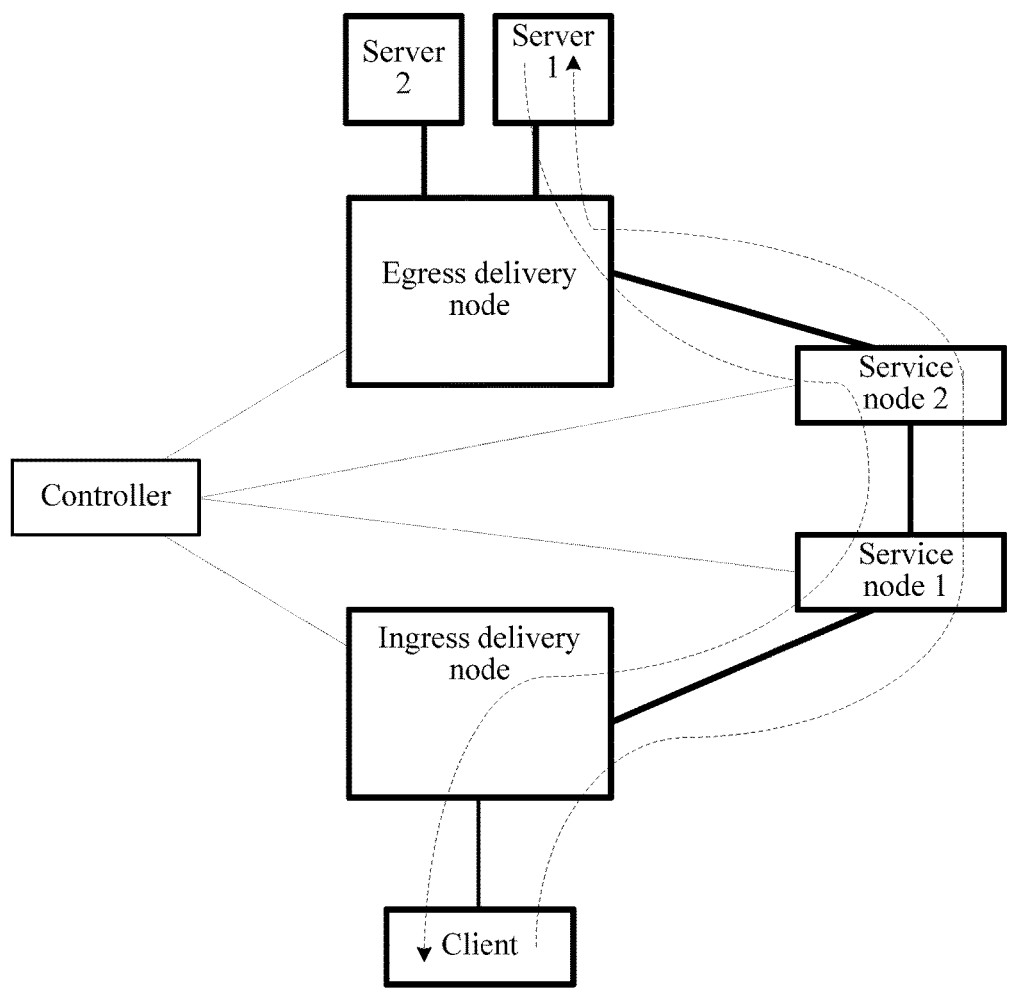
FIG. 3 is a schematic diagram of an application scenario according to an embodiment of the present disclosure.

FIG. 3 is an application scenario according to an embodiment of the present disclosure. In FIG. 3, a controller, an ingress delivery node, and an egress delivery node are included, where the controller configures the ingress delivery node and the egress delivery node, and configures a service node 1 and a service node 2 that are on a service chain between the ingress delivery node and the egress delivery node, where the service node 1 performs packet filtering processing, and the service node 2 performs NAT processing. The service node 1 is connected to a client, and the service node 2 is connected to a server 1 and a server 2. According to packet transmission paths shown by dashed lines in FIG. 3, traffic from the client to the server 1 is delivered by the ingress delivery node to the service chain to be processed. After completing the processing, the service chain sends the traffic to the egress delivery node, and then the egress delivery node sends the traffic to the server 1. A corresponding packet in an opposite direction is delivered by the egress delivery node to the service chain to be processed. After completing the processing, the service chain sends the packet to the ingress delivery node, and then the ingress delivery node sends the packet to the client. It should be understood that, FIG. 3 is only an example of an application scenario of this embodiment of the present disclosure, and this embodiment of the present disclosure is not limited to the application scenario shown in FIG. 3.

Figure 4:
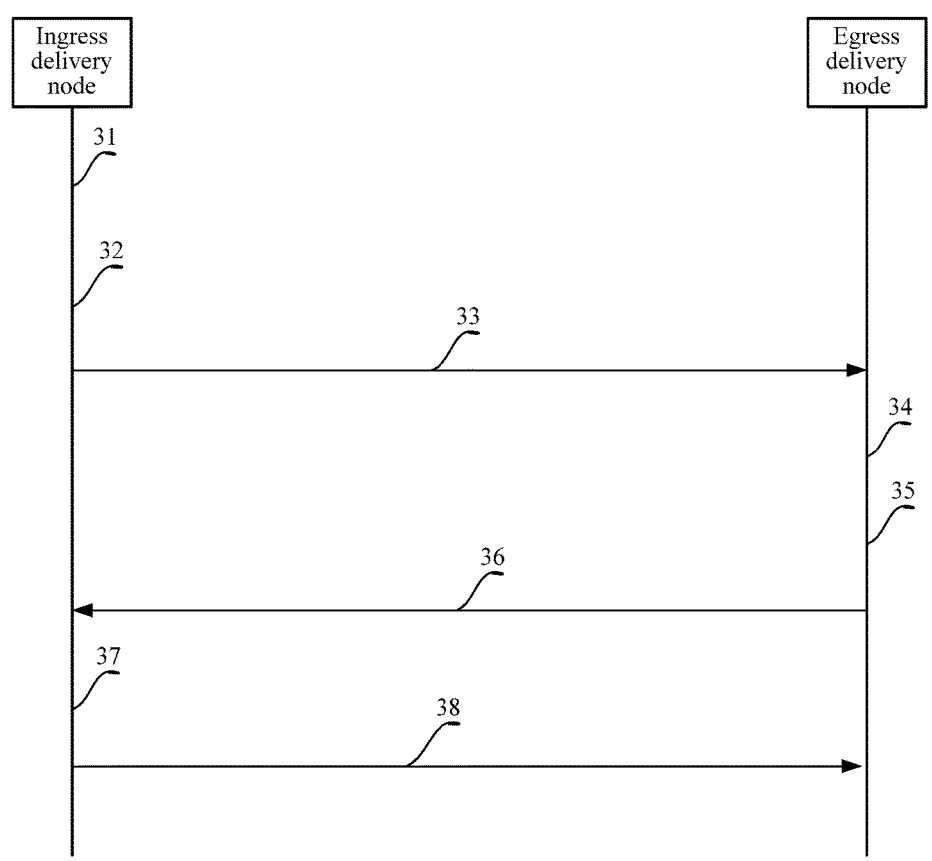
FIG. 4 is a flowchart of still another packet processing method according to an embodiment of the present disclosure.

Using the application scenario shown in FIG. 3 as an example, the following describes a packet processing method in this embodiment of the present disclosure in detail using an interaction procedure shown in FIG. 4.

As shown in FIG. 4, the packet processing method includes the following steps.

Step 31: An ingress delivery node receives a packet sent by an upstream node, and acquires quintuple information of the packet.

The quintuple includes a source IP address, a source media access control (MAC) address/source port number, a destination IP address, a destination MAC address/destination port number, and a transmission protocol of the packet.

As shown in FIG. 3, the packet may come from the client.

Step 32: If a service flow to which the packet belongs is a service flow that can be offloaded, the ingress delivery node creates a flow entry in a local flow table, allocates a flow entry identifier to the flow entry, and records, in the flow entry, the quintuple information of the packet, a current time, and the flow entry identifier.

If a service flow to which the packet belongs is a service flow that cannot be offloaded, processing is performed according to the prior art.

The packet is the first packet of the service flow to which the packet belongs.

Step 33: After adding an offloading option to a header of the packet, the ingress delivery node sends the packet to an egress delivery node to a service node on a service chain, where the offloading option includes information about the ingress delivery node, and the flow entry identifier.

The information about the ingress delivery node includes an IP address of the ingress delivery node.

As shown in Table 1, the IP address of the ingress delivery node is recorded in Service Source IP in the offloading option, and Flow ID is the flow entry identifier.

TABLE 1

| 31 | | 23 | 15 | | 0 |
|---|---|---|---|---|---|
| | Type = 252 | Length = 12 | | Reserved | |
| | | Service Source IP | | | |
| | | Flow ID | | | |

In this embodiment, the offloading option that includes the IP address of the ingress delivery node is directly added to an IP header of the packet. In other embodiments of the present disclosure, the IP address of the source ingress delivery node and the flow entry identifier may also be transmitted in another manner, for example, the egress delivery node configures a sequence number of the ingress delivery node, and the egress delivery node obtains the IP address of the ingress delivery node according to the sequence number of the ingress delivery node.

Figure 5:
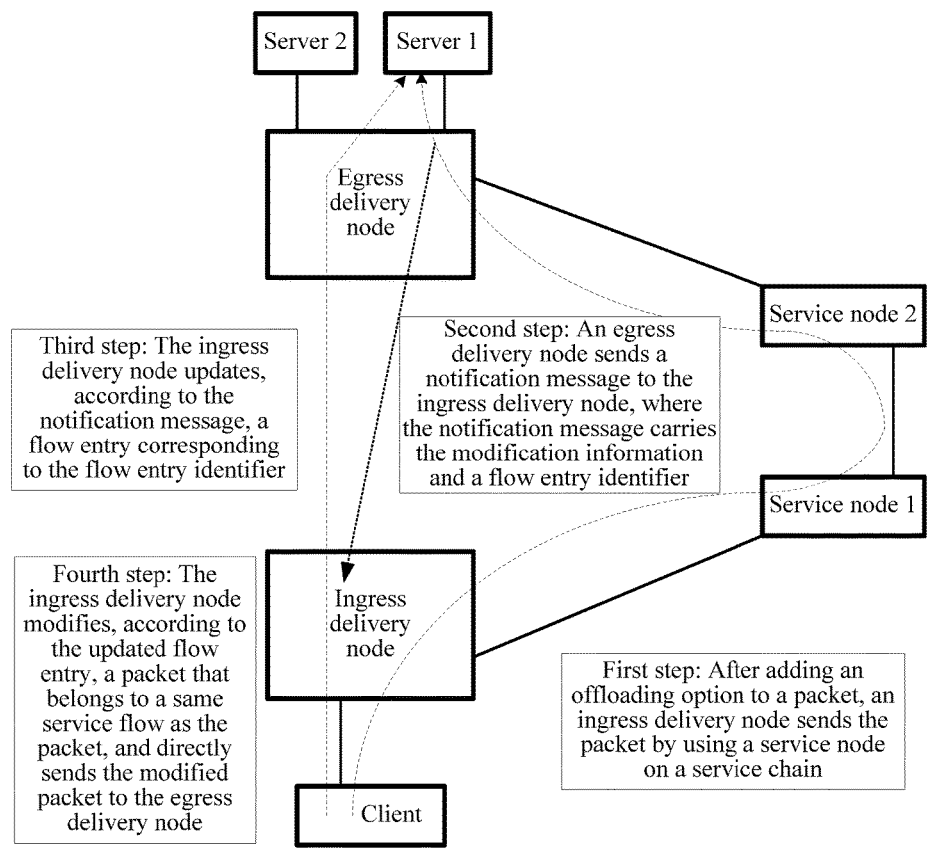
FIG. 5 is a schematic diagram of a packet path according to an embodiment of the present disclosure.

FIG. 5 is a schematic diagram of a packet path according to an embodiment of the present disclosure. As shown in a first step in FIG. 5, after adding an offloading option to a packet, an ingress delivery node sends the packet to a service node on a service chain.

In this embodiment of the present disclosure, transmission of the packet between the ingress delivery node and an egress delivery node and transmission of the packet between service nodes on the service chain may be implemented using an existing tunneling technology, for example, a Generic Routing Encapsulation (GRE) technology, a virtual extensible local area network (VXLAN) technology, or a multi-protocol label switching (MPLS) technology, which is not limited in this embodiment of the present disclosure.

Step 34: The egress delivery node receives the packet from a service node on a service chain.

Step 35: The egress delivery node detects whether the header of the packet carries the offloading option, and if the header of the received packet carries the offloading option, acquires modification information carried in the packet, where the modification information is obtained by modifying the quintuple information of the packet by a service node 1 and a service node 2.

The modification information obtained after the modification by the service chain may include a source IP address after address translation, a source port after address translation, a destination IP address after address translation, a destination port after address translation, and a modified transmission protocol.

Step 36: The egress delivery node sends a notification message to the ingress delivery node according to an IP address, in the offloading option, of the ingress delivery node, where the notification message carries the modification information and the flow entry identifier.

As shown in a second step in FIG. 5, the egress delivery node sends a notification message to the ingress delivery node, where the notification message carries the modification information and the flow entry identifier.

Step 37: The ingress delivery node records the modification information into the flow entry corresponding to the flow entry identifier.

As shown in a third step in FIG. 5, the ingress delivery node updates, according to the notification message, a flow entry corresponding to the flow entry identifier.

Step 38: The ingress delivery node modifies, according to the modification information, a subsequently received packet that belongs to a same service flow as the packet, and sends the modified packet to the egress delivery node.

As shown in a fourth step in FIG. 5, the ingress delivery node modifies, according to the updated flow entry, a packet that belongs to a same service flow as the packet, and directly sends the modified packet to the egress delivery node.

Before updating the flow entry corresponding to the flow entry identifier, the ingress delivery node continues to send a packet that hits the flow entry (that is, a packet that has quintuple information the same as original quintuple information recorded in the flow entry) to a service node on a service chain to perform processing. After the flow table is updated, the ingress delivery node modifies, according to the modification information stored in the flow entry, the packet that hits the flow entry, and the ingress delivery node directly sends the modified packet to the egress delivery node. Therefore, packet offloading is implemented, which can reduce processing load of the service node on the service chain.

In this embodiment of the present disclosure, the ingress delivery node may divide packets into two types before step 32: a service flow to which one type of packets (for example, packets of services such as packet filtering and NAT) belong is a service flow that can be offloaded, a service flow to which the other type of packets (for example, packets of services such as AV and IPS) belong is a service flow that cannot be offloaded. For a method for distinguishing whether a service flow to which a packet belongs is a service flow that can be offloaded or a service flow to which a packet belongs is a service flow that cannot be offloaded, refer to other embodiments, and details are not described herein again. If a service flow to which the packet belongs is a service flow that can be offloaded, the ingress delivery node continues to perform step 32, or if a service flow to which the packet belongs is a service flow that cannot be offloaded, the ingress delivery node performs processing according to an existing procedure, and does not perform packet traffic offloading.

In another embodiment of the present disclosure, the ingress delivery node may not distinguish whether a service flow to which the packet belongs is a service flow that can be offloaded, and the ingress delivery node adds an offloading option to the header of the packet, where in addition to the information about the ingress delivery node, and the flow entry identifier, the offloading option further includes a service type identifier. The service node on the service chain marks, on the service type identifier, a type of processing for the packet, to obtain a modified service type identifier. In this case, in step 35, the notification message sent by the egress delivery node further includes the modified service type identifier. The ingress delivery node determines, according to the modified service type identifier, that the service flow to which the packet belongs is a service flow that can be offloaded or the service flow to which the packet belongs is a service flow that cannot be offloaded. The ingress delivery node records, in the flow entry, that the service flow to which the packet belongs is a service flow that can be offloaded or the service flow to which the packet belongs is a service flow that cannot be offloaded, and processes, according to the updated flow entry, a subsequent packet that belongs to the same service flow as the packet.

In this embodiment of the present disclosure, the ingress delivery node receives the notification message, indicating that the packet can pass through the service node on the service chain, and the ingress delivery node records, in the flow table, that the packet is a packet that can pass through the service node on the service chain.

In this embodiment of the present disclosure, the ingress delivery node records that a time point at which the flow entry is created is TimeCurrent, and before TimeCurrent+T, the ingress delivery node continues to send a packet that hits the flow entry (that is, a packet that has quintuple information the same as the quintuple information recorded in the flow entry) to the service chain to perform processing. If the flow entry is not updated after a time T (that is, when the time point TimeCurrent+T arrives), it indicates that the packet is discarded when being processed by the service chain, and then the ingress delivery node directly discards a subsequently received packet that belongs to a same service flow as the packet. T is a preset time, and may be changed according to different application scenarios.

Figure 6:
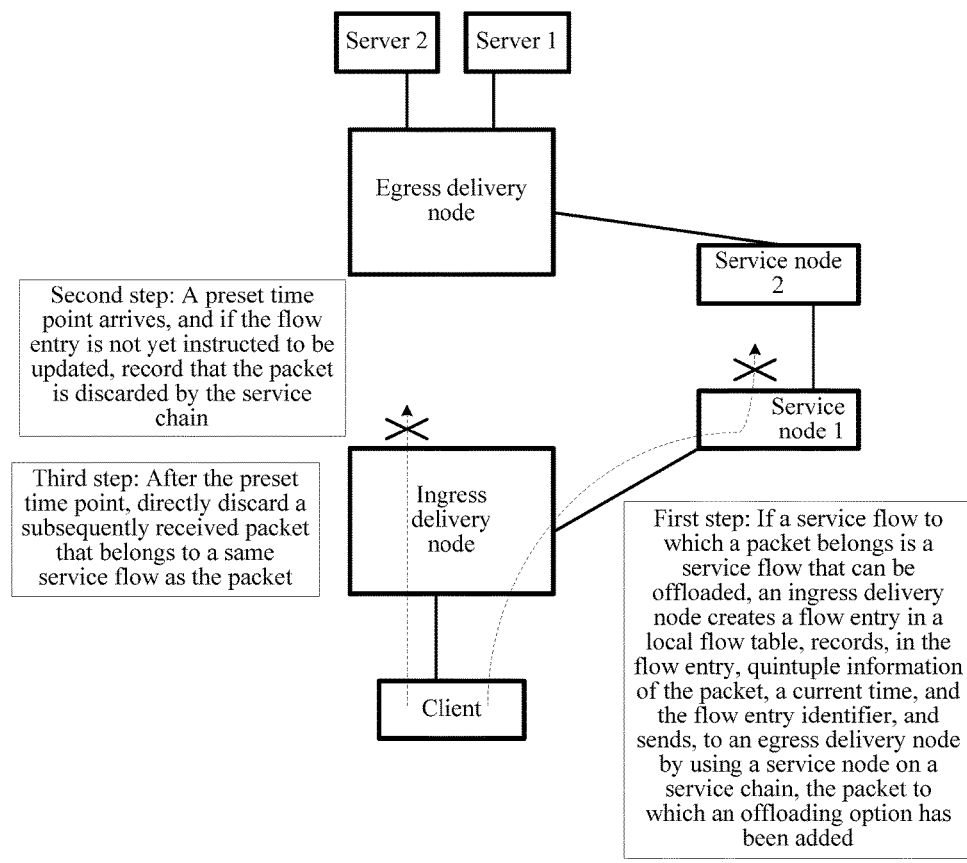
FIG. 6 is a schematic diagram of another packet path according to an embodiment of the present disclosure.

FIG. 6 is a schematic diagram of a packet path according to an embodiment of the present disclosure. As shown in FIG. 6, the packet path includes the following steps.

First step: If a service flow to which a packet belongs is a service flow that can be offloaded, an ingress delivery node creates a flow entry in a local flow table, records, in the flow entry, quintuple information of the packet, a current time, and a flow entry identifier, and sends the packet to an egress delivery node to a service node on a service chain, where an offloading option of the packet includes IP address of the ingress delivery node and the flow entry identifier.

If a service flow to which the packet belongs is a service flow that cannot be offloaded, processing is performed according to the prior art.

Second step: A preset time point arrives, and if the flow entry is not yet instructed to be updated, record that the packet is discarded by the service chain.

Third step: After the preset time point, directly discard a subsequently received packet that belongs to the same service flow as the packet.

Figure 7:
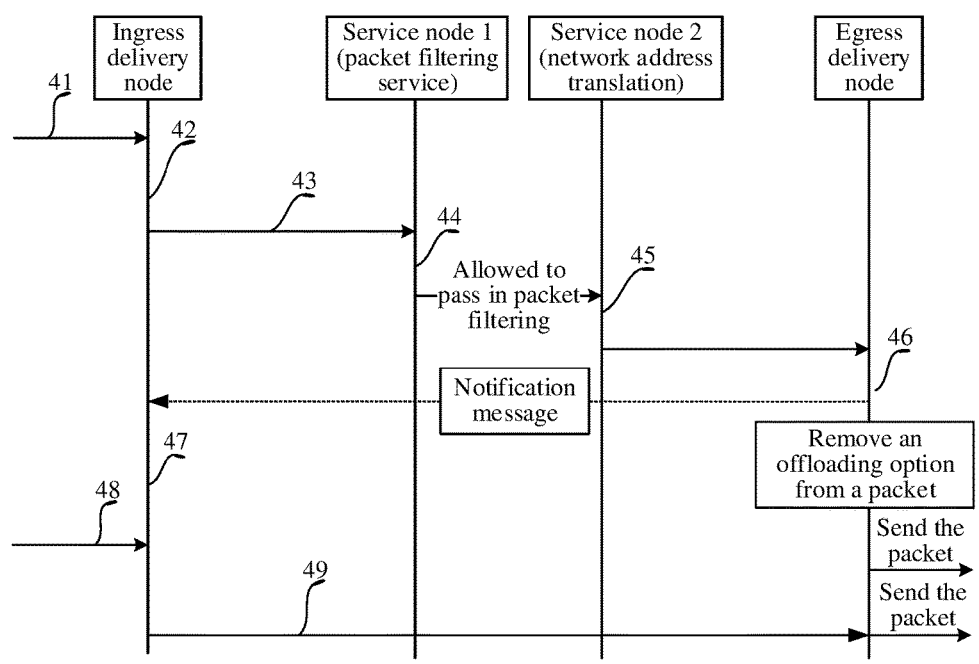
FIG. 7 is a flowchart of processing, using the scenario shown in FIG. 3, a packet that can pass through a service node on a service chain according to an embodiment of the present disclosure.

FIG. 7 is a flowchart of processing, applied in the scenario shown in FIG. 3, a packet that can pass through a service node on a service chain according to an embodiment of the present disclosure. The method includes the following steps.

Step 41: An ingress delivery node receives a packet.

Step 42: The ingress delivery node acquires quintuple information of the packet, creates a flow entry in a local flow table, records, in the flow entry, the quintuple information, and allocates a flow entry identifier to the flow entry.

Step 43: The ingress delivery node adds an offloading option to the packet, where the offloading option includes information about the ingress delivery node, the flow entry identifier, and a service type identifier.

The ingress delivery node adds the offloading option to an IP header of the packet. As shown in Table 2, in the offloading option, an IP address of the ingress delivery node is recorded in Service Source IP, Flow ID is the flow entry identifier, and Service Type is the service type identifier.

TABLE 2

| 31 | 23 | 15 | 0 |
|---|---|---|---|
| Type = 253 | Length = 16 | Reserved | |
| | Service Source IP | | |
| | Flow ID | | |
| | Service Type | | |

Further, the ingress delivery node sets all bits of a value of Service Type to 0, and the service node on the service chain sets Service Type to a value of a corresponding service type according to service processing performed by the service node, to obtain a modified service type identifier. An egress delivery node adds the modified service type identifier to a sent notification message. The ingress delivery node may determine, according to the modified service type identifier, that a service flow to which the packet belongs is a service flow that can be offloaded or a service flow to which the packet belongs is a service flow that cannot be offloaded, and update the flow entry.

Step 44: A service node 1 performs filtering processing on the received packet, where the packet is allowed to pass through the service node 1.

After passing through the service node 1, the packet reaches a service node 2.

Step 45: After a service node 2 performs NAT, that is, network address translation, on the packet, the packet carries the following parameters: a translated quintuple information, an address of the ingress delivery node, the flow entry identifier, and a modified service type identifier.

Step 46: An egress delivery node receives the packet, and if the packet carries the offloading option, sends a notification message to the ingress delivery node.

Step 47: The ingress delivery node searches the local flow table for a flow entry according to a flow entry identifier in the notification message, and updates the flow entry according to the notification message.

Further, the ingress delivery node determines an offloading identifier according to the modified service type identifier in the offloading option, where the offloading identifier is used to mark whether a service flow to which the packet belongs can be offloaded.

Further, the ingress delivery node updates the flow entry according to modification information in the notification message, the flow entry identifier, and the offloading identifier, where the updated flow entry includes the quintuple information, the modification information, and the offloading identifier.

Step 48: The ingress delivery node receives a subsequent packet that belongs to a same service flow as the packet.

Step 49: The ingress delivery node directly sends the modified subsequent packet to the egress delivery node according to information recorded in the flow entry.

Further, the ingress delivery node acquires quintuple information of the subsequent packet, finds the updated flow entry according to the quintuple information, modifies the subsequent packet according to the modification information when determining, according to the offloading identifier, that a packet in the service flow can be offloaded, and sends the modified subsequent packet to the egress delivery node, or the ingress delivery node acquires quintuple information of the subsequent packet, finds the updated flow entry according to the quintuple information, and sends the subsequent packet to the service node on the service chain when determining, according to the offloading identifier, that a packet in the service flow cannot be offloaded.

A packet processing procedure that is provided by this embodiment of the present disclosure and that is performed by an egress delivery node corresponding to the ingress delivery node in the embodiment corresponding to FIG. 7 includes a packet sent by an ingress delivery node passes through a service node on a service chain, and after the packet arrives at the egress delivery node, the egress delivery node detects whether the packet carries an offloading option, where the offloading option includes information about the ingress delivery node, the flow entry identifier, and the service type identifier.

If the packet carries the offloading option, the egress delivery node sends a notification message to the ingress delivery node, where the notification message includes modification information carried in the packet such that the ingress delivery node modifies, according to the modification information, a subsequent packet that belongs to a same service flow as the packet, and the notification message further includes the flow entry identifier and the service type identifier, and the modified service type identifier is obtained by updating, by the service node on the service chain, the service type identifier sent by the ingress delivery node.

If the packet does not carry the offloading option, the egress delivery node sends the packet to a subsequent device to perform processing.

Figure 8:
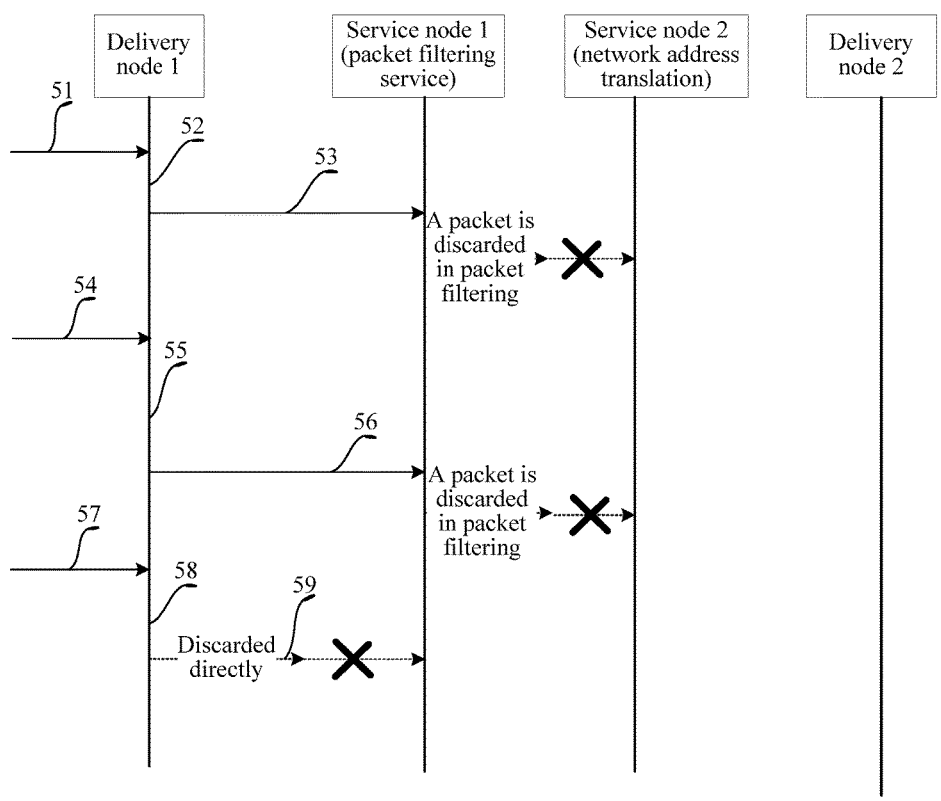
FIG. 8 is a flowchart of processing, using the scenario shown in FIG. 3, a packet discarded by a service chain according to an embodiment of the present disclosure.

FIG. 8 is a flowchart of processing, using the scenario shown in FIG. 3, a packet discarded by a service chain according to an embodiment of the present disclosure. The method includes:

Step 51: An ingress delivery node receives a packet.

Step 52: The ingress delivery node acquires quintuple information of the packet, creates a flow entry in a local flow table, records, in the flow entry, the quintuple information, allocates a flow entry identifier to the flow entry, and sets a preset time for the flow entry.

Step 53: The ingress delivery node adds an offloading option to the packet, where the offloading option includes information about the ingress delivery node, and the flow entry identifier.

The ingress delivery node adds the offloading option to an IP header of the packet. As shown in Table 1 above, in the offloading option, IP address of the ingress delivery node is recorded in Service Source IP, and Flow ID is the flow entry identifier.

In another embodiment of the present disclosure, the offloading option may further include a service type identifier. In this case, the offloading option is shown in Table 2 above.

Step 54: The ingress delivery node receives a subsequent packet that belongs to a same service flow as the packet.

Step 55: The ingress delivery node finds the flow entry according to quintuple information of the subsequent packet.

Step 56: If a current time does not reach the preset time, the ingress delivery node adds an offloading option to the packet, where the offloading option includes an address of the ingress delivery node and a flow entry identifier.

Step 57: The ingress delivery node receives a subsequent packet that belongs to a same service flow as the packet.

Step 58: The ingress delivery node finds the flow entry according to quintuple information of the subsequent packet.

Step 59: If a current time reaches the preset time, the flow entry has been updated, and an offloading identifier of the flow entry is no (that is, the packet does not pass through a service chain), the ingress delivery node directly discards the subsequent packet.

According to the method in this embodiment of the present disclosure, modification information that is returned by an egress delivery node after the egress delivery node receives a packet and that is carried in the packet is received, a subsequently received packet that belongs to a same service flow as the packet is modified according to the modification information, and the modified packet is sent to the egress delivery node. In this way, after modifying the subsequently received packet that belongs to the same service flow as the packet, the ingress delivery node directly sends the subsequently received packet to the egress delivery node such that the packet does not need to be processed by a service chain between the ingress delivery node and the egress delivery node, thereby implementing packet offloading, which can reduce load of a service node, and increase packet processing efficiency.

Figure 9:
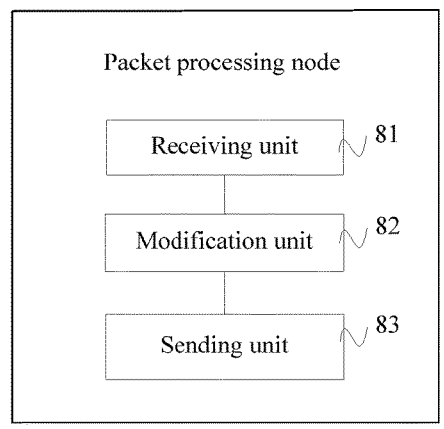
FIG. 9 is a first schematic structural diagram of a packet processing node according to an embodiment of the present disclosure.

As shown in FIG. 9, an embodiment of the present disclosure provides a packet processing node, including a receiving unit 81 configured to receive a notification message that is returned by an egress delivery node after the egress delivery node receives a first packet, where the notification message includes modification information carried in the first packet, a modification unit 82 configured to modify, according to the modification information, a subsequently received second packet that belongs to a same service flow as the first packet, and a sending unit 83 configured to send the modified second packet to the egress delivery node.

Optionally, the receiving unit 81 is further configured to receive the first packet, where the first packet includes quintuple information, and add an offloading option to the first packet, and the sending unit 83 is further configured to send, to a service node on a service chain, the first packet to which the offloading option has been added, where the first packet includes the quintuple information, and the modification information is modified quintuple information of the first packet, and the quintuple information of the first packet is modified by the service node on the service chain.

Figure 10:
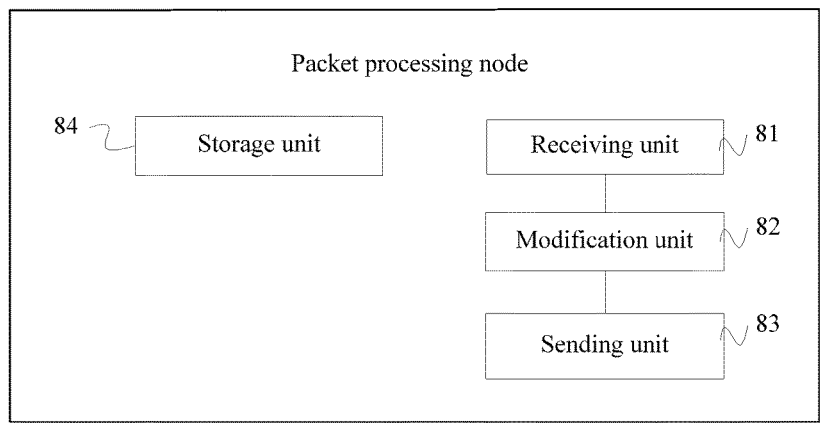
FIG. 10 is a second schematic structural diagram of a packet processing node according to an embodiment of the present disclosure.

Optionally, as shown in FIG. 10, the node further includes a storage unit 84 configured to store the quintuple information into a flow entry of a local flow table, and allocate a flow entry identifier to the flow entry.

Optionally, the notification message received by the receiving unit 81 further includes the flow entry identifier. The storage unit 84 is further configured to update the flow entry according to the flow entry identifier and the modification information, where the updated flow entry includes the quintuple information and the modification information, and accordingly, the modification unit 82 is further configured to receive the second packet, acquire quintuple information of the second packet, find the updated flow entry according to the quintuple information, and modify the second packet according to the modification information in the updated flow entry.

Optionally, the offloading option further includes a service type identifier. The notification message received by the receiving unit 81 further includes the flow entry identifier and a modified service type identifier that is obtained by updating the service type identifier by a service node on the service chain. The storage unit 84 is further configured to determine an offloading identifier according to the modified service type identifier, and update the flow entry according to the modification information, the flow entry identifier, and the offloading identifier, where the updated flow entry includes the quintuple information, the modification information, and the offloading identifier, and accordingly, the modification unit 82 is further configured to receive the second packet, acquire quintuple information of the second packet, find the updated flow entry according to the quintuple information, and when it is determined, according to the offloading identifier, that a packet in the service flow can be offloaded, modify the second packet according to the modification information.

Optionally, the receiving unit 81 is further configured to receive a third packet, and add an offloading option to the third packet, and the sending unit 83 is further configured to send the third packet to which the offloading option has been added.

Figure 11:
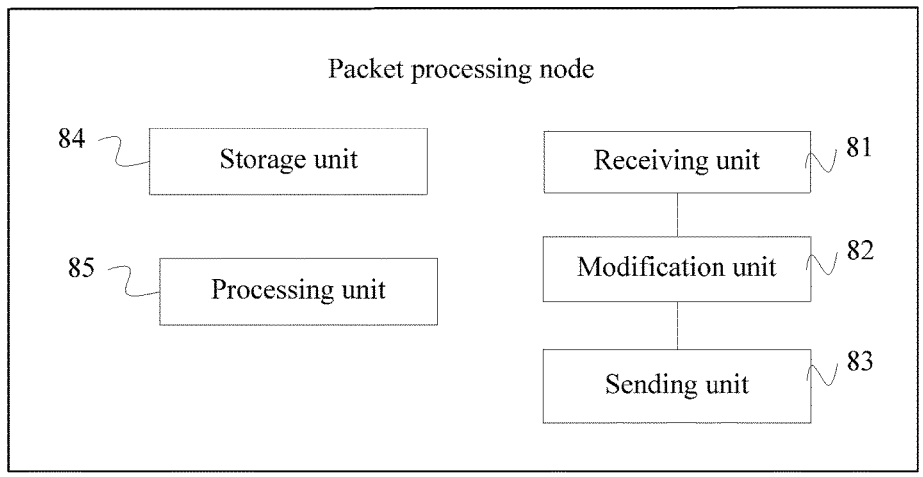
FIG. 11 is a third schematic structural diagram of a packet processing node according to an embodiment of the present disclosure.

As shown in FIG. 11, the node further includes a processing unit 85 configured to discard a subsequently received fourth packet that belongs to a same service flow as the third packet if a second notification message that carries modification information of the third packet and that is returned by the egress delivery node according to the third packet is not received within a preset time.

The node in this embodiment of the present disclosure can implement the foregoing corresponding method embodiment. For a detailed implementation process, refer to the foregoing method embodiment, and details are not described herein again.

According to the node in this embodiment of the present disclosure, modification information that is returned by an egress delivery node after the egress delivery node receives a first packet and that is carried in the first packet is received, a subsequently received second packet that belongs to a same service flow as the first packet is modified according to the modification information, and the modified second packet is sent to the egress delivery node. In this way, after modifying the subsequently received second packet that belongs to the same service flow as the first packet, an ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

Figure 12:
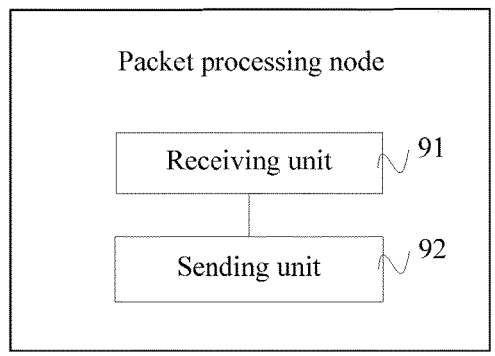
FIG. 12 is a first schematic structural diagram of another packet processing node according to an embodiment of the present disclosure.

As shown in FIG. 12, an embodiment of the present disclosure provides a packet processing node, including a receiving unit 91 configured to receive a first packet from a service node on a service chain, where the first packet carries modification information and an offloading option, and a sending unit 92 configured to return a notification message to an ingress delivery node according to the offloading option, where the notification message includes the modification information carried in the first packet such that the ingress delivery node modifies, according to the modification information, a second packet that belongs to a same service flow as the first packet, where the receiving unit 91 is further configured to receive the modified second packet sent by the ingress delivery node.

Figure 13:
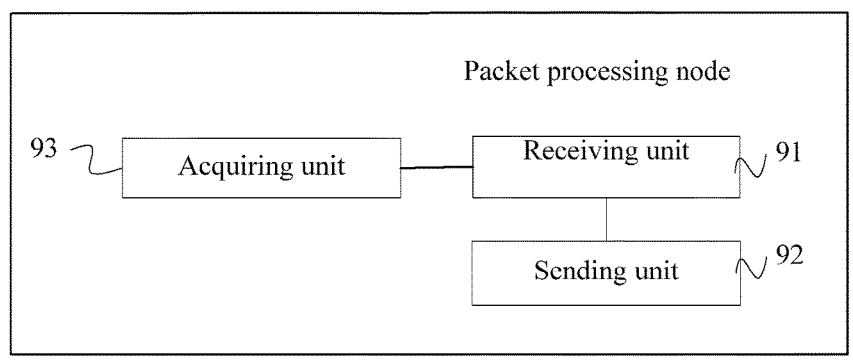
FIG. 13 is a second schematic structural diagram of another packet processing node according to an embodiment of the present disclosure.

Optionally, the offloading option includes information about the ingress delivery node, and a flow entry identifier. As shown in FIG. 13, the node further includes an acquiring unit 93 configured to acquire the information about the ingress delivery node, and the flow entry identifier that are in the offloading option, and accordingly, the sending unit 92 is further configured to send the notification message to the ingress delivery node according to the information about the ingress delivery node, where the notification message further includes the flow entry identifier.

Optionally, the offloading option further includes a modified service type identifier, where the modified service type identifier is obtained by updating, by the service node on the service chain, a service type identifier sent by the ingress delivery node. The acquiring unit 93 is further configured to acquire the information about the ingress delivery node, the flow entry identifier, and the modified service type identifier that are in the offloading option, and accordingly, the sending unit 92 is further configured to send the notification message to the ingress delivery node according to the information about the ingress delivery node, where the notification message includes the flow entry identifier and the modified service type identifier.

The node in this embodiment of the present disclosure can implement the foregoing corresponding method embodiment. For a detailed implementation process, refer to the foregoing method embodiment, and details are not described herein again.

According to the node in this embodiment of the present disclosure, after a first packet is received, modification information carried in the first packet is returned to an ingress delivery node such that the ingress delivery node modifies, according to the modification information, a second packet that belongs to a same service flow as the first packet, and the modified second packet sent by the ingress delivery node is received. In this way, after modifying the subsequently received second packet that belongs to the same service flow as the first packet, the ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

Figure 14:
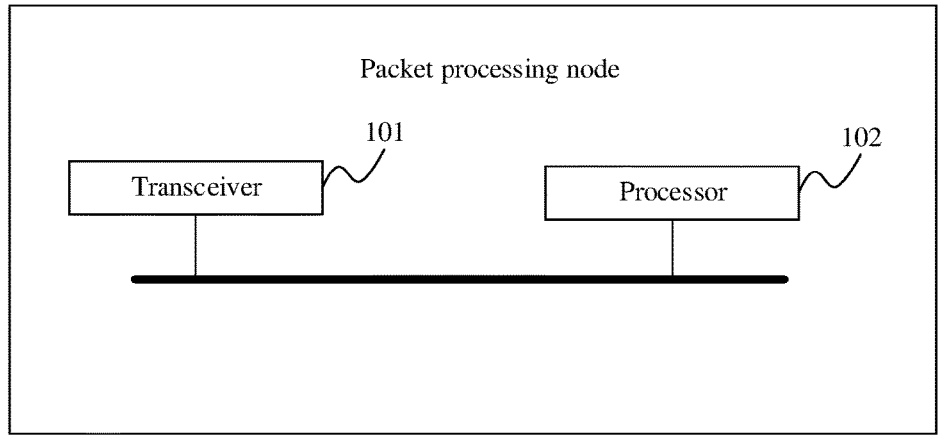
FIG. 14 is a schematic structural diagram of still another packet processing node according to an embodiment of the present disclosure.

As shown in FIG. 14, an embodiment of the present disclosure provides a packet processing node, including a transceiver 101 configured to receive a notification message that is returned by an egress delivery node after the egress delivery node receives a first packet, where the notification message includes modification information carried in the first packet, and a processor 102 configured to modify, according to the modification information, a subsequently received second packet that belongs to a same service flow as the first packet.

The transceiver 101 is further configured to send the modified second packet to the egress delivery node.

Optionally, the transceiver 101 is further configured to receive the first packet, where the first packet includes quintuple information.

Optionally, the processor 102 is further configured to add an offloading option to the first packet, where the offloading option includes information about an ingress delivery node, and a flow entry identifier.

Optionally, the transceiver 101 is further configured to send, to a service node on a service chain, the first packet to which the offloading option has been added.

Optionally, the processor 102 is further configured to store the quintuple information into a flow entry of a local flow table, and allocate the flow entry identifier to the flow entry.

Optionally, the notification message further includes the flow entry identifier.

Optionally, the modification information is modified quintuple information of the first packet, and the quintuple information of the first packet is modified by the service node on the service chain.

Optionally, the processor 102 is further configured to update the flow entry according to the flow entry identifier and the modification information, where the updated flow entry includes the quintuple information and the modification information, and accordingly, optionally, the transceiver 101 is further configured to receive the second packet, acquire quintuple information of the second packet, find the updated flow entry according to the quintuple information, and modify the second packet according to the modification information in the updated flow entry.

Optionally, the offloading option further includes a service type identifier, and the notification message further includes the flow entry identifier and a modified service type identifier that is obtained by updating the service type identifier by a service node on the service chain.

Optionally, the processor 102 is further configured to determine an offloading identifier according to the modified service type identifier, and update the flow entry according to the modification information, the flow entry identifier, and the offloading identifier, where the updated flow entry includes the quintuple information, the modification information, and the offloading identifier.

Accordingly, optionally, the processor 102 is further configured to receive the second packet, acquire quintuple information of the second packet, find the updated flow entry according to the quintuple information, and when it is determined, according to the offloading identifier, that a packet in the service flow can be offloaded, modify the second packet according to the modification information.

Optionally, the transceiver 101 is further configured to receive a third packet, add an offloading option to the third packet, and send the third packet to which the offloading option has been added.

Optionally, the processor 102 is further configured to discard a subsequently received fourth packet that belongs to a same service flow as the third packet if a second notification message that carries modification information of the third packet and that is returned by the egress delivery node according to the third packet is not received within a preset time.

The node in this embodiment of the present disclosure can implement the foregoing corresponding method embodiment. For a detailed implementation process, refer to the foregoing method embodiment, and details are not described herein again.

According to the node in this embodiment of the present disclosure, modification information that is returned by an egress delivery node after the egress delivery node receives a first packet and that is carried in the first packet is received, a subsequently received second packet that belongs to a same service flow as the first packet is modified according to the modification information, and the modified second packet is sent to the egress delivery node. In this way, after modifying the subsequently received second packet that belongs to the same service flow as the first packet, an ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

Figure 15:
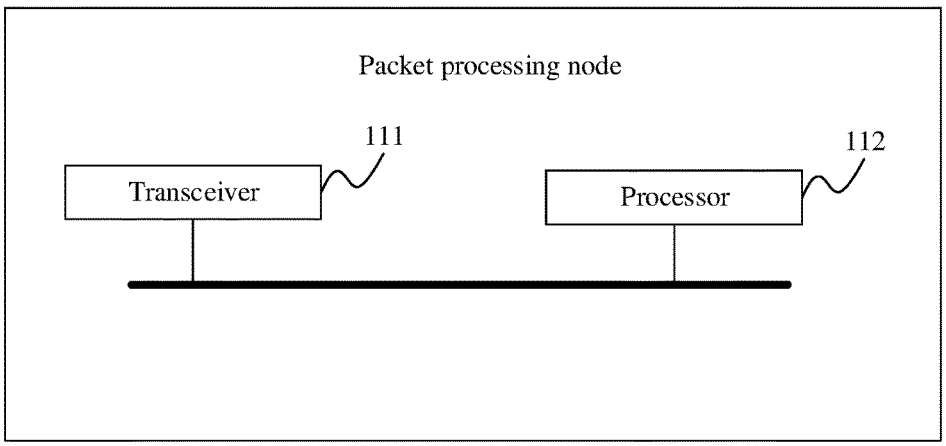
FIG. 15 is a schematic structural diagram of yet another packet processing node according to an embodiment of the present disclosure.

As shown in FIG. 15, an embodiment of the present disclosure provides a packet processing node, including a transceiver 111 configured to receive a first packet from a service node on a service chain, where the first packet carries modification information and an offloading option, send a notification message to an ingress delivery node according to the offloading option, where the notification message includes the modification information carried in the first packet such that the ingress delivery node modifies, according to the modification information, a second packet that belongs to a same service flow as the first packet, and receive the modified second packet sent by the ingress delivery node.

Optionally, the first packet includes quintuple information, where the modification information is modified quintuple information of the first packet, and the quintuple information of the first packet is modified by the service node on the service chain.

Optionally, the offloading option includes information about the ingress delivery node, and a flow entry identifier.

Optionally, the node further includes a processor 112 configured to acquire the information about the ingress delivery node, and the flow entry identifier that are in the offloading option, and send the notification message to the ingress delivery node according to the information about the ingress delivery node, where the notification message further includes the flow entry identifier.

Optionally, the offloading option further includes a modified service type identifier, where the modified service type identifier is obtained by updating, by the service node on the service chain, a service type identifier sent by the ingress delivery node.

Optionally, the transceiver 111 is further configured to acquire the information about the ingress delivery node, the flow entry identifier, and the modified service type identifier that are in the offloading option, and send the notification message to the ingress delivery node according to the information about the ingress delivery node, where the notification message includes the flow entry identifier and the modified service type identifier.

The node in this embodiment of the present disclosure can implement the foregoing corresponding method embodiment. For a detailed implementation process, refer to the foregoing method embodiment, and details are not described herein again.

According to the node in this embodiment of the present disclosure, after a first packet is received, modification information carried in the first packet is returned to an ingress delivery node such that the ingress delivery node modifies, according to the modification information, a second packet that belongs to a same service flow as the first packet, and the modified second packet sent by the ingress delivery node is received. In this way, after modifying the subsequently received second packet that belongs to the same service flow as the first packet, the ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

Figure 16:
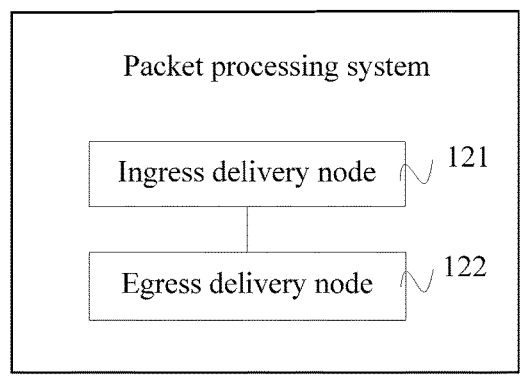
FIG. 16 is a schematic structural diagram of a packet processing system according to an embodiment of the present disclosure.

As shown in FIG. 16, an embodiment of the present disclosure provides a packet processing system, including an ingress delivery node 121 and an egress delivery node 122.

The ingress delivery node 121 is the ingress processing node provided in any one of the foregoing embodiments, and the egress delivery node 122 is the egress processing node provided in any one of the foregoing embodiments.

According to the packet processing system in this embodiment of the present disclosure, modification information that is returned by an egress delivery node after the egress delivery node receives a first packet and that is carried in the first packet is received, a subsequently received second packet that belongs to a same service flow as the first packet is modified according to the modification information, and the modified second packet is sent to the egress delivery node. In this way, after modifying the subsequently received second packet that belongs to the same service flow as the first packet, an ingress delivery node directly sends the subsequently received second packet to the egress delivery node such that the second packet does not need to be processed by a service chain between the ingress delivery node and the egress delivery node, thereby implementing packet offloading, which can reduce load of a service node, and increase packet processing efficiency.

A person of ordinary skill in the art may understand that, each aspect of the present disclosure or a possible implementation manner of each aspect may be further implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory ((EPROM) or flash memory), an optical fiber, and a compact disc read only memory (CD-ROM).

A processor in a computer reads computer-readable program code stored in a computer-readable medium such that the processor can perform a function and an action specified in each step or a combination of steps in a flowchart, an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A method performed by an ingress delivery node of a service chain, the service chain comprising multiple service nodes, and the method comprising:
   receiving a notification message from an egress delivery node of the service chain, the notification message comprising modification information;
   modifying, according to the modification information, a subsequently received second packet to produce a modified second packet; and
   sending the modified second packet to the egress delivery node such that the modified second packet does not pass through the service nodes on the service chain.

2. The method of claim 1, wherein before receiving the notification message from the egress delivery node of the service chain, the method further comprises:
   receiving a first packet comprising quintuple information and the modification information, the first packet and a second packet belonging to a service flow, and the modification information being modified quintuple information of the first packet;
   adding an offloading option to the first packet, the offloading option comprising information about the ingress delivery node and a flow entry identifier; and
   sending, to at least one of the service nodes on the service chain, the first packet to which the offloading option has been added.

3. The method of claim 2, wherein after receiving the first packet and before sending, to the at least one of the service nodes on the service chain, the first packet to which the offloading option has been added, the method further comprises:
   storing the quintuple information into a flow entry of a local flow table; and
   allocating the flow entry identifier to the flow entry.

4. The method of claim 3, wherein the notification message further comprises the flow entry identifier, the method further comprises updating the flow entry according to the flow entry identifier and the modification information to produce an updated flow entry comprises the quintuple information and the modification information, and modifying, according to the modification information, the subsequently received second packet comprises:
   receiving the second packet;
   acquiring quintuple information of the second packet;
   finding the updated flow entry according to the quintuple information; and
   modifying the second packet according to the modification information in the updated flow entry.

5. The method of claim 3, wherein the offloading option further comprises a service type identifier, the notification message further comprises the flow entry identifier and a modified service type identifier that is obtained by updating the service type identifier by the at least one of the service nodes on the service chain, and the method further comprises:
   determining an offloading identifier according to the modified service type identifier; and
   updating the flow entry according to the modification information, the flow entry identifier, and the offloading identifier to produce an updated flow entry comprising the quintuple information, the modification information, and the offloading identifier, and
   modifying, according to the modification information, the subsequently received second packet comprises:
   receiving the second packet;
   acquiring quintuple information of the second packet;
   finding the updated flow entry according to the quintuple information; and
   modifying the second packet according to the modification information when it is determined, according to the offloading identifier, that a packet in the service flow can be offloaded.

6. The method of claim 1, wherein the method further comprises:
   receiving a third packet;
   adding another offloading option to the third packet;
   sending the third packet to which the another offloading option has been added; and
   discarding a subsequently received fourth packet when a second notification message that carries modification information of the third packet is not received from the egress delivery node within a preset time, the third packet and the subsequently received fourth packet belonging to a second service flow.

7. A method performed by an egress delivery node of a service chain, the service chain comprising multiple service nodes, and the method comprising:
   receiving a first packet from at least one of the service nodes on the service chain, the first packet carrying modification information and an offloading option;

sending a notification message to an ingress delivery node of the service chain according to the offloading option, the notification message comprising the modification information carried in the first packet; and receiving a modified second packet from the ingress delivery node, without the modified second packet passing through the service nodes on the service chain, the modified second packet belonging to a same service flow as the first packet.

8. The method of claim 7, wherein the first packet comprises quintuple information, and the modification information is modified quintuple information of the first packet.

9. The method of claim 8, wherein the offloading option comprises information about the ingress delivery node and a flow entry identifier, and sending the notification message to the ingress delivery node of the service chain according to the offloading option comprises:

acquiring the information about the ingress delivery node and the flow entry identifier that are in the offloading option; and sending the notification message to the ingress delivery node according to the information about the ingress delivery node, the notification message further comprising the flow entry identifier.

10. The method of claim 9, wherein the offloading option further comprises a modified service type identifier, the modified service type identifier is obtained by updating, by at least one of the service nodes on the service chain, a service type identifier from the ingress delivery node, and sending the notification message to the ingress delivery node according to the offloading option comprises:

acquiring the information about the ingress delivery node, the flow entry identifier, and the modified service type identifier that are in the offloading option; and sending the notification message to the ingress delivery node according to the information about the ingress delivery node, the notification message comprising the flow entry identifier and the modified service type identifier.

11. The method of claim 7, wherein the offloading option comprises information about the ingress delivery node and a flow entry identifier, and sending the notification message to the ingress delivery node of the service chain according to the offloading option comprises:

acquiring information about the ingress delivery node and the flow entry identifier that are in the offloading option; and sending the notification message to the ingress delivery node according to the information about the ingress delivery node, the notification message further comprising the flow entry identifier.

12. A node that is an ingress delivery node of a service chain, the service chain comprising multiple service nodes, and the node comprising:

a receiver configured to receive a notification message from an egress delivery node of the service chain, the notification message comprising modification information;

a processor coupled to the receiver and configured to modify, according to the modification information, a subsequently received second packet to produce a modified second packet; and a transmitter coupled to the processor and configured to send the modified second packet to the egress delivery node such that the modified second packet does not pass through the service nodes on the service chain.

13. The node of claim 12, wherein the receiver is further configured to:

receive a first packet comprising quintuple information and the modification information, the first packet and a second packet belonging to a service flow, and the modification information being modified quintuple information of the first packet; and add an offloading option to the first packet, the offloading option comprising information about the ingress delivery node and a flow entry identifier, and the transmitter is further configured to send, to one of the service nodes on the service chain, the first packet to which the offloading option has been added.

14. The node of claim 13, wherein the node further comprises a memory coupled to the processor and configured to:

store the quintuple information into a flow entry of a local flow table; and allocate the flow entry identifier to the flow entry.

15. The node of claim 14, wherein the notification message received by the receiver further comprises the flow entry identifier, the memory is further configured to update the flow entry according to the flow entry identifier and the modification information to produce an updated flow entry comprises the quintuple information and the modification information, and the processor is further configured to:

receive the second packet;

acquire quintuple information of the second packet;

find the updated flow entry according to the quintuple information; and modify the second packet according to the modification information in the updated flow entry.

16. The node of claim 14, wherein the offloading option further comprises a service type identifier, the notification message received by the receiver further comprises the flow entry identifier and a modified service type identifier that is obtained by updating the service type identifier by at least one of the service nodes on the service chain, the processor is further configured to:

determine an offloading identifier according to the modified service type identifier; and update the flow entry according to the modification information, the flow entry identifier, and the offloading identifier to produce an updated flow entry comprising the quintuple information, the modification information, and the offloading identifier;

receive the second packet;

acquire quintuple information of the second packet;

find the updated flow entry according to the quintuple information; and modify the second packet according to the modification information when it is determined, according to the offloading identifier, that a packet in the service flow can be offloaded.

17. The node of claim 12, wherein the receiver is further configured to:

receive a third packet; and add another offloading option to the third packet, the transmitter being further configured to send the third packet to which the another offloading option has been added, and the processor being further configured to discard a subsequently received fourth packet when a second notification message that carries modification information of the third packet is not received from the egress delivery node within a preset time, the third packet and the subsequently received fourth packet belonging to a second service flow.

18. A node that is an egress delivery node of a service chain, the service chain comprising multiple service nodes, and the node comprising:
   a receiver configured to receive a first packet from at least one of the service nodes on the service chain, the first packet carrying modification information and an offloading option;
   a transmitter coupled to the receiver and configured to send a notification message to an ingress delivery node of the service chain according to the offloading option, the notification message comprising the modification information carried in the first packet, and
   the receiver being further configured to receive a modified second packet from the ingress delivery node without the modified second packet passing through the service nodes on the service chain, the modified second packet belonging to a same service flow as the first packet.

19. The node of claim 18, wherein the offloading option comprises information about the ingress delivery node and a flow entry identifier, and the node further comprises:
   a processor coupled to the transmitter and the receiver and configured to acquire the information about the ingress delivery node and the flow entry identifier that are in the offloading option, and
   the transmitter being further configured to send the notification message to the ingress delivery node according to the information about the ingress delivery node, the notification message further comprising the flow entry identifier.

20. The node of claim 19, wherein the offloading option further comprises a modified service type identifier, the modified service type identifier is obtained by updating, by the service nodes on the service chain, a service type identifier from the ingress delivery node, the processor is further configured to acquire the information about the ingress delivery node, the flow entry identifier, and the modified service type identifier that are in the offloading option, and the transmitter is further configured to send the notification message to the ingress delivery node according to the information about the ingress delivery node, the notification message comprises the flow entry identifier and the modified service type identifier.

* * * * *